No. 849,286. PATENTED APR. 2, 1907.
C. THERRIEN, Sr.
WHEEL HUB.
APPLICATION FILED JULY 27, 1905.
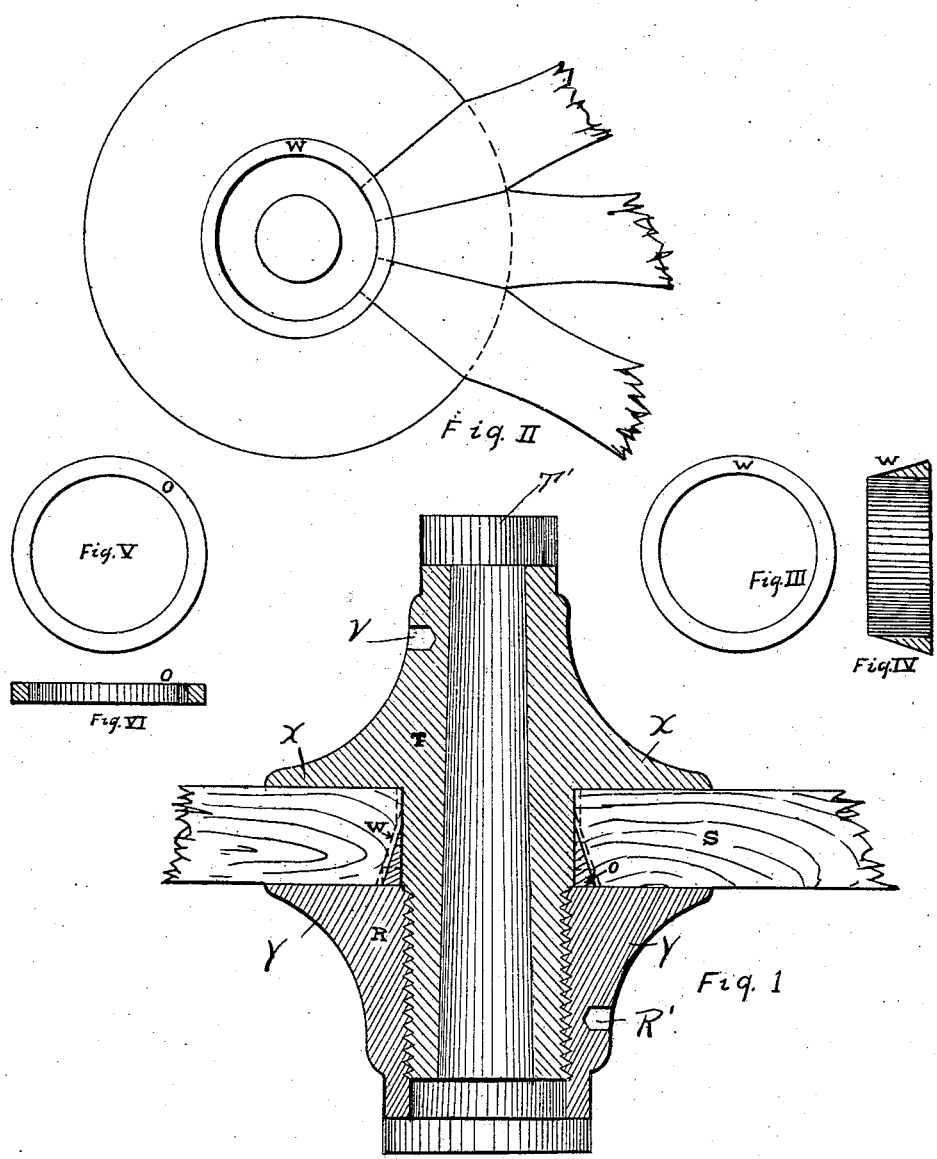

UNITED STATES PATENT OFFICE.

CHARLES THERRIEN, SR., OF LAKE LINDEN, MICHIGAN.

WHEEL-HUB.

No. 849,286.  Specification of Letters Patent.  Patented April 2, 1907.

Application filed July 27, 1905. Serial No. 271,540.

*To all whom it may concern:*

Be it known that I, CHARLES THERRIEN, Sr., a citizen of the United States, residing at Lake Linden, in the county of Houghton, State of Michigan, have invented a new and useful Vehicle or other Wheel Hub, of which the following is a specification.

This invention has relation to vehicle and other wheel hubs from which spokes extend radially and support a rim on their outer ends.

It is the object of the invention to provide such improvements in vehicle-wheel hubs as that the inner end of each spoke shall be held firmly and securely in the hub.

It is also the object of the invention to provide such improvements as will enable any part of the wheel or hub that may become loose by shrinkage or other causes to be readily tightened without removing the rim or tire.

It is furthermore the object of the invention to provide improvements whereby a spoke or any part of the wheel or hub that may need repair or replacement may have the required thing done without displacing or unduly straining any other part.

Again, it is the object of the invention to effect such an organization of a vehicle-wheel and its hub as will enable the tire to be tightened with great readiness and little trouble and without taking it off the wheel.

The nature of my invention consists in the following-described improvements, one embodiment or form of which is shown in the annexed drawings, which form a part of this specification, and of which—

Figure I is a central sectional view of the hub and the inner portions of the spokes connected therewith. Fig. II is a transverse section showing the inner portion of three of the spokes and the wedge-ring in position. Figs. III and IV are respectively a plan and section of the wedge-ring. Figs. V and VI are similar views, respectively, of the expansion-ring.

Similar reference characters designate corresponding parts or features, as the case may be, wherever they occur.

The hub is composed of two members, an outer member T and an inner member R. The outer member extends the entire distance of the axle-spindle and its offsets or shoulders and is formed on its outer end to receive a band T'. The outer member is screw-threaded from the inner line of spokes to its inner end, so that the inner member may be screwed thereon up against the inner side of the spokes, and the inner side of a wedge-band W is interposed between the inner ends of the spokes and the inward extension of the outer member, as is clearly shown in Fig. I.

The inner ends of the spokes S are beveled to correspond to the bevel on the outer surface of the wedge band or ring W, on which the spokes are stepped or rest, and a commonly-formed spanner may be used in the notch R', formed in the member R, to turn the same up against the spokes, a notch or hole V in the member T being made to receive the end of another spanner to hold said member stationary while the other member is being turned. In this way, with the sides of the spokes at their inner ends being properly formed to constitute a solid ring between the flanges X and Y of the members T and R, respectively, a perfectly-constructed vehicle-wheel is presented in which should any of its parts need repair or replacement said part or parts can be readily and quickly taken out and fixed without needlessly disturbing any other part beyond turning off the inner member by a spanner or wrench, as previously explained.

When it becomes necessary to tighten the wheel from shrinkage or other causes, the inner member R is removed and an expansion-ring O inserted behind the wedge-ring W. The inner member is then replaced and on being screwed up tightly against the spokes forces the wedge-ring outward a distance equal to the thickness of the expansion-ring, moving each spoke outwardly a proportionate distance and expanding the same against the felly of the wheel.

The hub is intended to be cast from iron, brass, or aluminium, as desired.

It will be noted that the structure as a whole is exceedingly simple and that it is as durable, commodious, and generally efficient as it is simple.

In explaining a form of means in which the invention may be embodied I do not mean to be strictly confined to said form, since I contemplate latitude for the exercise of mechanical skill to vary the form and arrangement of parts to meet exigencies without departing from the nature or spirit of the invention.

I claim—

A vehicle-wheel hub comprising flanged outer and inner members, the outer member having a screw-threaded extension upon which the inner member is turned, combined with spokes arranged and clamped between the flanges of said members; a wedge-shaped annular band disposed upon said inward extension with its inclined face bearing against the inner ends of the spokes; and an expansion-ring located upon said inward extension behind said wedge-shaped band and bearing against the rear face of the latter, the said inner ends of the spokes being beveled to fit on the surface of the wedge-shaped band, and the expansion-ring being adapted, when the inner member is screwed up tightly upon said extension to force said band outwardly upon said extension and said spokes outwardly, to expand the spokes against the wheel-felly.

In testimony whereof I have signed my name to this specification, in the presence of two subscribing witnesses, this 24th day of July, 1905.

CHARLES $\overset{\text{his}}{\times}$ THERRIEN, Sr.
mark

Witnesses:
JACOB STEFFES,
GREGORY THERRIEN.